United States Patent
Herfs et al.

(10) Patent No.: US 12,526,901 B2
(45) Date of Patent: Jan. 13, 2026

(54) TRANSMITTING A NOTIFICATION IN DEPENDENCE ON WHAT CAUSED A LIGHT SOURCE TO BE ON WHILE A USER IS AWAY

(71) Applicant: SIGNIFY HOLDING B.V., Eindhoven (NL)

(72) Inventors: Jean Petrus Anna Herfs, Eindhoven (NL); Kéké Dandois, Minderhout (BE)

(73) Assignee: SIGNIFY HOLDING B.V., Eindhoven (NL)

(*) Notice: Subject to any disclaimer, the term of this patent is extended or adjusted under 35 U.S.C. 154(b) by 253 days.

(21) Appl. No.: 18/036,915

(22) PCT Filed: Nov. 9, 2021

(86) PCT No.: PCT/EP2021/081110
§ 371 (c)(1),
(2) Date: May 15, 2023

(87) PCT Pub. No.: WO2022/101199
PCT Pub. Date: May 19, 2022

(65) Prior Publication Data
US 2024/0008160 A1 Jan. 4, 2024

(30) Foreign Application Priority Data
Nov. 16, 2020 (EP) .................... 20207767

(51) Int. Cl.
*H05B 47/19* (2020.01)
*G08B 21/24* (2006.01)
*H05B 47/175* (2020.01)

(52) U.S. Cl.
CPC .......... *H05B 47/19* (2020.01); *G08B 21/24* (2013.01); *H05B 47/196* (2024.01)

(58) Field of Classification Search
CPC ...... G08B 21/24; G08B 25/08; H05B 47/115; H05B 47/19; H05B 47/196; Y02B 20/40
See application file for complete search history.

(56) References Cited

U.S. PATENT DOCUMENTS

| | | | |
|---|---|---|---|
| 10,986,717 B1 * | 4/2021 | Fu | H05B 45/12 |
| 2013/0234840 A1 | 9/2013 | Trundle et al. | |
| 2016/0189526 A1 | 6/2016 | Kennedy et al. | |
| 2018/0041044 A1 | 2/2018 | Son et al. | |
| 2018/0061220 A1 | 3/2018 | Greene | |
| 2018/0330589 A1 | 11/2018 | Horling | |

(Continued)

*Primary Examiner* — Raymond R Chai

(57) ABSTRACT

A method comprises receiving (101) user information, determining (103) that a user is away from home based on the user information, and receiving (105) light information from a lighting system which comprises a light source. The light information is indicative of the state of the light source. The method further comprises determining (107), based on the light information, that the light source is on while the user is away from home, determining (109) what caused the light source to be turned on if it has been determined that the light source is on while the user is away from home and deciding (111) whether or not to notify the user in dependence on the cause after the cause has been determined. After the decision has been made, the notification is transmitted (113) to a user device of the user in dependence on the decision.

13 Claims, 6 Drawing Sheets

(56) References Cited

U.S. PATENT DOCUMENTS

| | | | | |
|---|---|---|---|---|
| 2018/0364665 A1* | 12/2018 | Clymer | .................... | F24F 11/56 |
| 2019/0259262 A1 | 8/2019 | Amini et al. | | |
| 2019/0297712 A1* | 9/2019 | Chema | ................... | H05B 47/19 |
| 2020/0357263 A1* | 11/2020 | Peterson | ................ | G04G 21/08 |

* cited by examiner

TRANSMITTING A NOTIFICATION IN DEPENDENCE ON WHAT CAUSED A LIGHT SOURCE TO BE ON WHILE A USER IS AWAY

CROSS-REFERENCE TO PRIOR APPLICATIONS

This application is the U.S. National Phase application under 35 U.S.C. § 371 of International Application No. PCT/EP2021/081110, filed on Nov. 9, 2021, which claims the benefit of European Patent Application No. 20207767.3, filed on Nov. 16, 2020. These applications are hereby incorporated by reference herein.

FIELD OF THE INVENTION

The invention relates to a system for transmitting a notification to a user device, said system being configured to determine a state of a light source, said light source being comprised in a lighting system.

The invention further relates to a method of transmitting a notification from a system to a user device, said system being configured to determine a state of a light source, said light source being comprised in a lighting system.

The invention also relates to a computer program product enabling a computer system to perform such a method.

BACKGROUND OF THE INVENTION

There are multiple ways of measuring energy consumption of lighting systems, e.g. by measuring real time usage or by measuring how long lights are turned on. In smart lighting, it is usually possible to obtain information on which lights are turned on. By making a user aware of the energy consumed by his lighting system, energy savings can be realized.

Systems that help a user more to save energy are also known. For example, US 2019/297712 A1 discloses that a "Smart Off" mode may be enabled while in an "Away" period. In this "Smart Off" mode, a smart light switch will automatically turn the room light off after a period when a visual sensor detects that no one is in the room.

Existing systems tend to simply turn off lights or notify users about the fact that the lights are still turned on. However, sometimes lights are turned on with good reason even when nobody is at home, e.g. when lights are turned on as a response to a motion sensor, a smart doorbell or because of safety features like presence mimicking. Existing solutions will either turn these lights off or notify the user to turn off these lights. This often leads to users turning off the energy saving feature, because it does not do what they want it to. This negates the potential energy savings.

SUMMARY OF THE INVENTION

It is a first object of the invention to provide a system, which can be used to reduce energy consumption by a lighting system in a user-friendly manner.

It is a second object of the invention to provide a method, which can be used to reduce energy consumption by a lighting system in a user-friendly manner.

In a first aspect of the invention, a system for transmitting a notification to a user device, said system being configured to determine a state of a light source, said light source being comprised in a lighting system, comprises at least one input interface, at least one output interface, and at least one processor configured to receive user information via said at least one input interface, determine that a user is away from home based on said user information, receive light information from said lighting system via said at least one input interface, said light information being indicative of said state of said light source, determine, based on said light information, that said light source is on while said user is away from home, if it has been determined that said light source is on while said user is away from home, determine what caused said light source to be turned on, after said cause has been determined, decide whether or not to notify said user in dependence on said cause, and after said decision has been made, transmit, via said at least one output interface, said notification to said user device of said user in dependence on said decision.

This system assesses the cause of a light being turned on to provide improved energy savings operations and/or notifications. For example, the system may decide to notify the user immediately if the light is not needed and if it is beneficial to act immediately. Else, the fact that the light is still turned on while the user is away may be summarized in a report that is sent on an interval (e.g. daily, weekly, monthly). The user may be able to configure for which causes he wants to be notified.

Said at least one processor may be configured to generate a report for said user on a regular basis and include in said report, in dependence on said cause, that said light source was on while said user was way from home. This may help the user achieve energy savings for less urgent cases.

Said at least one processor may be configured to determine what caused said light source to be turned on by determining whether user control or automatic control caused said light source to be turned on. User control may comprise interaction with said user device, a further user device (e.g. of another person living in the same home) or a light switch, for example. A light source that was manually switched on and is still on while the user is away is more likely to be left on by accident. Automatic control may comprise control based on sensor data and/or time-based control, for example. A light source that was automatically switched on may be intended to be on while the user is away but could also be switched on due to an improper configuration.

Said at least one processor may be configured to, upon determining that automatic control caused said light source to be turned on, determine a frequency with which said light source is being turned on and off and/or a quantity of turned-on light sources and decide, based on said frequency and/or said quantity, whether or not to notify said user. For example, a sensor-triggered light source that switches on and off with a high frequency may require urgent attention. A relatively large quantity of turned-on light sources in a smart lighting system may indicate that a power outage has occurred. In a smart lighting system, the light sources may automatically turn on after a power outage, even if they were off before the power outage.

Said at least one processor may be configured to, upon determining that said light source is on while said user is away from home, determine whether a setting or rule exists which automatically turns off said light source and decide, based on said cause and in dependence on said existence of said setting or rule, whether or not to notify said user. If the light source will be turned off automatically, urgent action is likely not required.

Said at least one processor may be configured to determine what caused said light source to be turned on by determining a name associated with an action of turning on said light source, an event that caused light source to turn on, and/or a source of a control command to turn on said light source. The name may be the name of a person who performed the action or the name of an application, e.g. an IFTT application running in the cloud, that performed the action. A descriptor of the event may indicate that a certain time has been reached (e.g. 9 am or sunrise) or that a certain sensor has been triggered. The source of the control action may be a user device or a sensor device, for example.

Said at least one processor may be configured to decide whether or not to notify said user in dependence on a spatial location of said light source. For example, a light source located at the entrance may be needed for security or easy entrance at night and it may therefore not be desirable to transmit notifications for this light source.

Said at least one processor may be configured to receive user input indicative of one or more causes and associate said one or more causes with an instruction to notify said user or with an instruction not to notify said user when one of said one or more causes caused a light source to be turned on. This allows the user to personalize the notifications by specifying one or more causes or by providing feedback to notifications.

Said at least one processor may be configured to receive user input indicative of one or more light sources and associate said one or more light sources with an instruction not to notify said user when a light source of said one or more light sources is on while said user is away from home. For example, the user may want to keep one light source in the living room switched on to hide the fact that no one is home.

Said at least one processor may be configured to, upon determining that said light source is on while said user is away from home and a time-out period has elapsed, determine what caused said light source to be turned on. This may be used to prevent that notifications are transmitted immediately after the user has left home, e.g. for lights that automatically turn off when no presence is detected during a certain time.

Said at least one processor may be configured to include in said notification an option to turn off said light source and control said light source to turn off said light source upon receiving an affirmative response from said user device. This allows the user to save energy during the period that he is away.

Said at least one processor may be configured to include in said notification an option to adjust a setting or rule which caused said light source to turn on and adjust said setting or rule upon receiving an affirmative response from said user device. For example, the notification may include a link that redirects to an application with which the user can make configuration changes. This allows the user to save energy over a longer period of time.

In a second aspect of the invention, a method of transmitting a notification from a system to a user device, said system being configured to determine a state of a light source, said light source being comprised in a lighting system, comprises receiving user information, determining that a user is away from home based on said user information, receiving light information from said lighting system, said light information being indicative of said state of said light source, determining, based on said light information, that said light source is on while said user is away from home, if it has been determined that said light source is on while said user is away from home, determining what caused said light source to be turned on, after said cause has been determined, deciding whether or not to notify said user in dependence on said cause, and after said decision has been made, transmitting said notification to said user device of said user in dependence on said decision. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for transmitting a notification from a system to a user device, said system being configured to determine a state of a light source, said light source being comprised in a lighting system.

The executable operations comprise receiving user information, determining that a user is away from home based on said user information, receiving light information from said lighting system, said light information being indicative of said state of said light source, determining, based on said light information, that said light source is on while said user is away from home, if it has been determined that said light source is on while said user is away from home, determining what caused said light source to be turned on, after said cause has been determined, deciding whether or not to notify said user in dependence on said cause, and after said decision has been made, transmitting said notification to said user device of said user in dependence on said decision.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
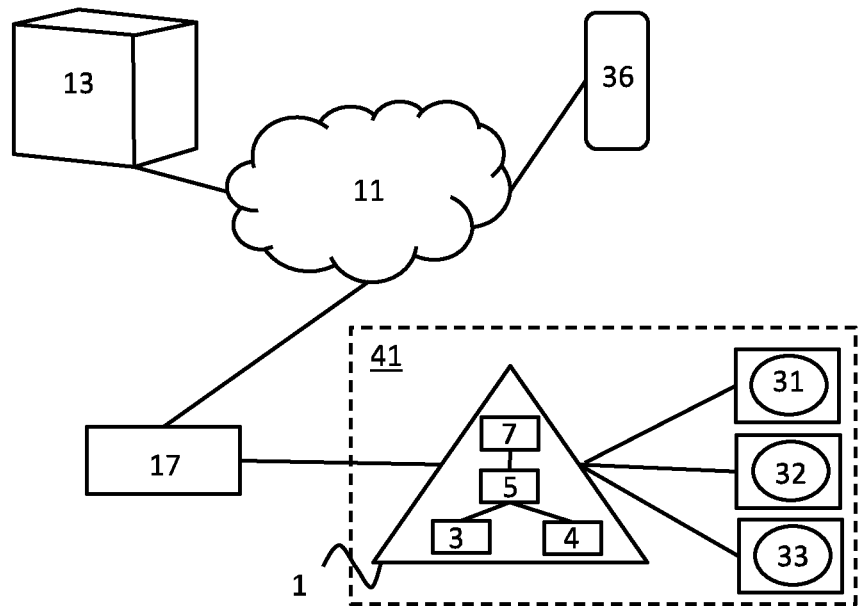
FIG. 1 is a block diagram of a first embodiment of the system.

FIG. 1 shows a first embodiment of the system for transmitting a notification to a user device. The system is configured to determine a state (including at least on and off) of a light source which is comprised in a lighting system. In this first embodiment, the system is a bridge 1. The bridge 1 may be a Philips Hue bridge, for example. In the example of FIG. 1, a lighting system 41 comprises the bridge 1 and three light sources 31-33, and the user device is a mobile device 36. The lighting devices that comprise the light sources 31-33 communicate with the bridge 1, e.g. using Zigbee technology. A lighting device may be powered while the light source is off. A light source may be an LED module, for example.

The bridge 1 is connected to a wireless LAN access point 17, e.g. via Ethernet or Wi-Fi. The wireless LAN access point 17 is connected to the Internet 11. An Internet server 13 is also connected to the Internet 11. The mobile device 36 is able to control the light sources 31-33 via the wireless LAN access point 17 and the bridge 1 when the user is at home (not shown in FIG. 1). The mobile device 36 may be able to control the light sources 31-33 via Internet server 13 and the bridge 1 when the user is not at home. The mobile device 36 runs an app for controlling light sources 31-33, for example.

The bridge 1 comprises a receiver 3, a transmitter 4, a processor 5, and a memory 7. The processor 5 is configured to receive user information via the receiver 3, determine that a user is away from home based on the user information, and receive light information from the lighting system 41 via the receiver 3. The user information may be received from the mobile device 36, for example. The user information may comprise the GPS location of the user or may indicate an away status which has been set manually by the user. If the user information comprises the GPS location of the user, a GPS location of the home where the bridge 1 is located should also be known, e.g. configured in the bridge 1, in order to determine whether the user is home or away from home. Alternatively, the user information may be received from a presence detection system. The light information is indicative of the state of one of the light sources 31-33 and may be received from the lighting device which comprises the light source.

The processor 5 is further configured to determine, based on the light information, that the light source is on while the user is away from home, and if it has been determined that the light source is on while the user is away from home, determine what caused the light source to be turned on. The processor 5 is further configured to, after the cause has been determined, decide whether or not to notify the user in dependence on the cause, and after the decision has been made, transmit, via the transmitter 4, the notification to the mobile device 36 of the user in dependence on the decision. A user may be able to configure the period of the day in which he would like to be notified.

In the embodiment of FIG. 1, the processor 5 is further configured to generate a report for the user on a regular basis and include in the report, in dependence on the cause, that the light source was on while the user was way from home. This report may be transmitted to the user device 36 and/or stored on the Internet server 13, for example. For example, it the system decides that the light that is turned on while the user is away is not needed, but it is not urgent enough to take action immediately, the occurrence may be summarized in a report that is sent on an interval (e.g. daily, weekly, monthly), e.g. configured by the user.

Urgency is determined based on the cause, i.e. based on what caused the light source to be on. Urgency may be determined based on previous user feedback for occurrences with the same cause, e.g. by allowing a user to postpone taking action with a "not now" feedback option. Whether a light source being on while the user is away results in a notification, inclusion in a report or no action may depend on the amount of power consumption. Reports may be made by aggregating suggestions about power consumption. Patterns could be detected over time to improve the suggestions and summarize notifications into groups. The user may be able to set power consumption thresholds above which the user wants to be notified. The report may indicate how long the light source were turned on for and suggest a setting change. For example, if a presence sensor in an alley turns on the lights for 60 minutes, the report may propose setting this to a lower duration to save energy.

The processor 5 may be configured to switch to an "away-from-home" mode when the mobile device 36 is detected to be outside the home (e.g. using geofencing) or when the user manually switches to the "away-from-home" mode. The former is beneficial when the user is living by himself. Alternatively, smart door locks and/or presence sensors presence detection sensors may be used to detect whether someone is at home, i.e. whether the user and other persons living in the home are away from home. In the embodiment of FIG. 1, only the user of the mobile device 36 receives a notification from the bridge 1.

Preferably, the processor 5 is configured to determine that the user is away, i.e. that no one is at home, for a time period long enough to conclude that no more lighting is needed. Certain lights may automatically be turned off, e.g. when a presence sensor has not detected presence during a certain period. It may be possible to determine based on information received from this presence sensor what a proper timeout period would be before assuming that the lights are desired to be turned off. It is also possible to make the user configure this timeout period.

Smart home lighting systems can usually detect which lights are turned on and may even record when they were turned on. It would also be possible to obtain this information for a non-connected lighting system by installing light intensity measuring sensors. Another option to obtain this information would be to measure the power consumption of lights or even the whole home and comparing that to the average level when all lights are turned off.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise solid-state memory, for example. The memory 7 may be used to store a table of connected lights, for example.

The receiver 3 and the transmitter 4 may use one or more wired or wireless communication technologies, e.g. Ethernet for communicating with the wireless LAN access point 17 and Zigbee for communicating with the lighting devices, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

Figure 2:
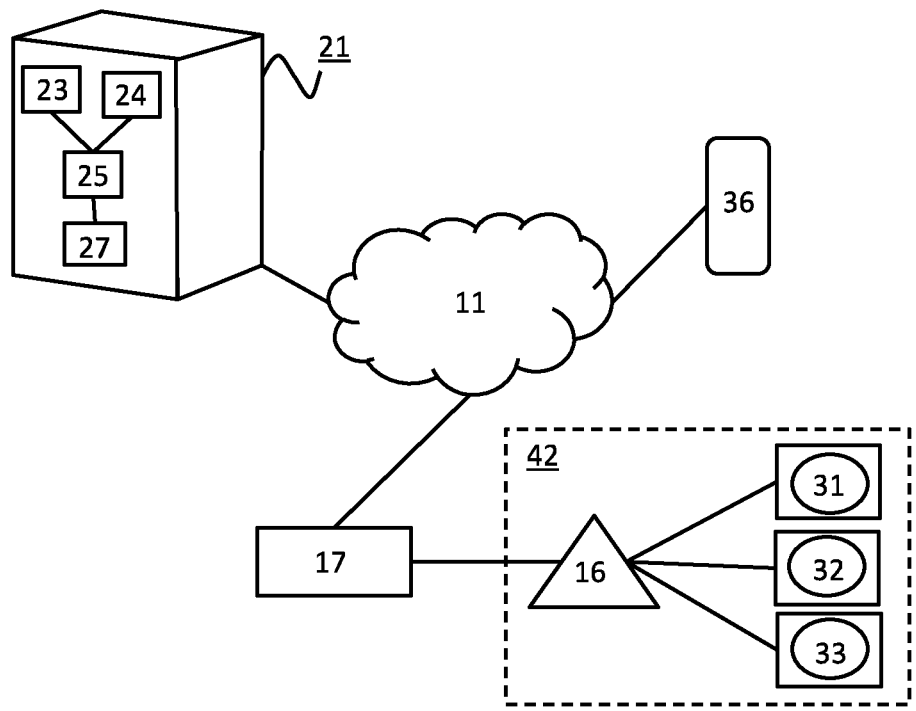
FIG. 2 is a block diagram of a second embodiment of the system.

FIG. 2 shows a second embodiment of the system for transmitting a notification to a user device. The system is configured to determine a state of a light source which is comprised in a lighting system. In this first embodiment, the system is a computer 21. The computer 21 is an Internet server connected to the Internet 11. In the example of FIG. 2, a lighting system 42 comprises a bridge 16 and the three light sources 31-33, and the user device is the mobile device 36. In the example of FIG. 2, the lighting system 42 comprises a bridge. Alternatively, the lighting system 42 might not comprise a bridge.

The computer 21 comprises a receiver 23, a transmitter 24, a processor 25, and storage means 27. The processor 25 is configured to receive user information via the receiver 23, determine that a user is away from home based on the user information, and receive light information from the lighting system 42 via the receiver 23. The user information may be received from the mobile device 36, for example. The user information may comprise the GPS location of the user or may indicate an away status which has been set manually by the user, for example. Alternatively, the user information may be received from a presence detection system. The light information is indicative of the state of one of the light sources 31-33 and may be received from the lighting device which comprises the light source or from the bridge 16, for example.

The processor 25 is further configured to determine, based on the light information, that the light source is on while the user is away from home, and if it has been determined that the light source is on while the user is away from home, determine what caused the light source to be turned on. The processor 25 is further configured to, after the cause has been determined, decide whether or not to notify the user in dependence on the cause, and after the decision has been made, transmit, via the transmitter 24, the notification to the mobile device 36 of the user in dependence on the decision.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to connect to the Internet 11, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiments of FIGS. 1-2, the system of the invention comprises a bridge or a computer. In an alternative embodiment, the system of the invention is a different device. In the embodiments of FIGS. 1-2, the system of the invention comprises a single device. In an alternative embodiment, the system of the invention comprises a plurality of devices. Although the user device is a mobile device in the examples of FIGS. 1-2, other types of devices may be used as user device.

Figure 3:
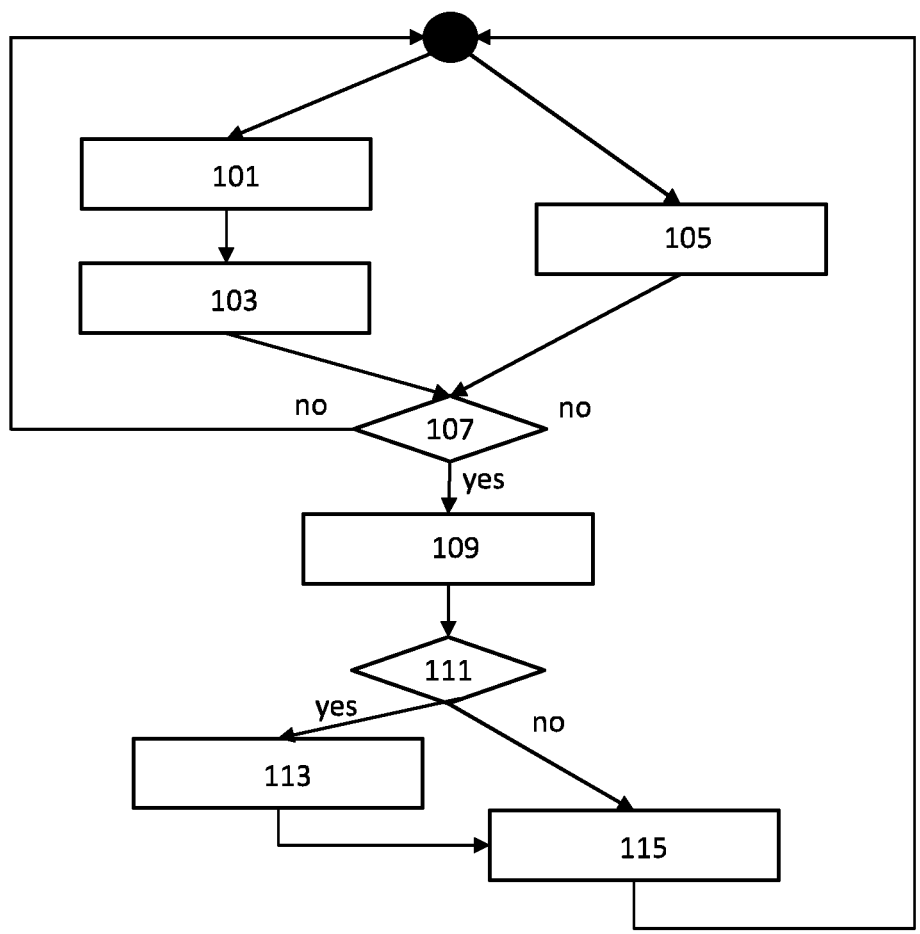
FIG. 3 is a flow diagram of a first embodiment of the method.

A first embodiment of the method of transmitting a notification from a system to a user device is shown in FIG. 3. The system is configured to determine a state of a light source. The light source is comprised in a lighting system. A step 101 comprises receiving user information. A step 103 comprises determining that a user is away from home based on the user information. A step 105 comprises receiving light information from the lighting system. The light information is indicative of the state of the light source, e.g. on or off.

A step 107 is performed only after user information and light information has been received and is performed as soon as new user information or new light information has been received. Step 107 comprises determining, based on the light information received in step 105, whether the light source is on while the user is away from home, as determined in step 103. If it has been determined in step 107 that the light source is on while the user is away from home, a step 109 is performed. Step 109 comprises determining what caused the light source to be turned on. For example, step 109 may comprise detecting whether presence mimicking is active and for which lights. Else, steps 101-103 and/or step 105 are repeated at a later time, after which step 107 is repeated.

After the cause has been determined in step 109, a step 111 is performed. Step 111 comprises deciding whether or not to notify the user in dependence on the cause. After the decision has been made in step 111, a next step is selected in dependence on the decision. If the decision was made to notify the user, a step 113 is performed. Step 113 comprises transmitting the notification to the user device of the user. If the decision was made not to notify the user, a step 115 is or may be performed, e.g. dependent on the cause determined in step 109. Step 115 comprises logging that the light source was on while the user was way from home. This log entry is included in a report that is generated for the user on a regular basis (not shown in FIG. 3). Step 115 is also performed after step 113. After step 115, steps 101-103 and/or step 105 are repeated at a later time.

Figure 4:
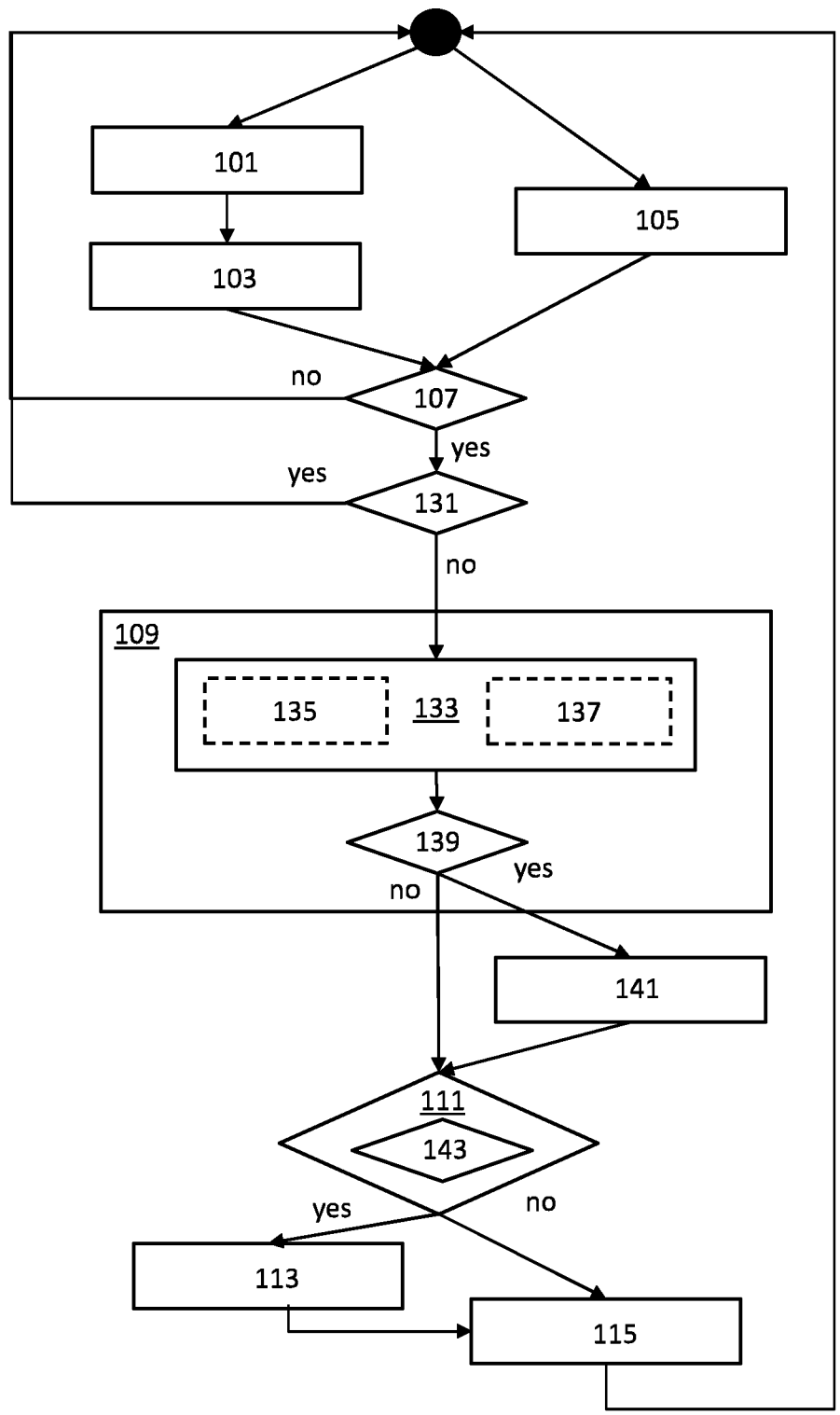
FIG. 4 is a flow diagram of a second embodiment of the method.

A second embodiment of the method of transmitting a notification from a system to a user device is shown in FIG. 4. The system is configured to determine a state of a light source. The light source is comprised in a lighting system. Step 101 comprises receiving user information. Step 103 comprises determining that a user is away from home based on the user information. Step 105 comprises receiving light information from the lighting system. The light information is indicative of the state of the light source.

Step 107 comprises determining, based on the light information received in step 105, whether the light source is on while the user is away from home, as determined in step 103. If it has been determined in step 107 that the light source is on while the user is away from home, a step 131 is performed. Else, steps 101-103 and/or step 105 are repeated at a later time, after which step 107 is repeated.

Step 131 comprises determining whether a setting or rule exists which automatically turns off the light source. For example, machine learning may be used to predict if the light source will be turned off soon and not bother the user in that situation. If there is a rule that will turn the light off soon, no action is needed. If the light was turned on by a sensor that is configured to turn on lights only temporarily (for example until there is no more presence detected for a certain amount of time), no action is needed. This helps prevent unnecessary suggestions/notifications. If it is determined in step 131 that such a setting or rule exists, steps 101-103 and/or step 105 are repeated at a later time, after which step 107 is repeated. Else, step 109 is performed after step 131. Step 109 comprises determining what caused the light source to be turned on.

In the embodiment of FIG. 4, step 109 is implemented by steps 133-139. Step 133 is performed after step 131. Step 133 comprises determining a source of a control command to turn on the light source. This source may be a user device, a light switch or a presence sensor, for example. Smart lighting systems are usually able to provide an indication of what triggered a light to be controlled, either by tracing events that were triggered recently, or by storing an information property in the light control system itself that represents how the light source was turned on and/or by which device or user. It may be possible to determine the source of the control command from this information.

For example, an identifier of the API used to control the lights via the bridge (or other controller), the IP or MAC source address of the command message, the port to which commands are sent, or the device name, may be used to determine the source of the command. Furthermore, default behavior of such a source may be determined (e.g. it may be downloadable predefined behavior or it may be learned behavior based on how the source operates when a user is at home—where the user may be able to correct the behavior if it is out of line).

Step 133 may comprise an optional step 135. Step 135 comprises determining a name associated with an action of turning on the light source. When a user first connects to the smart lighting system, he authenticates for example with a username that is entered or generated for the user. When a user connects a system like IFTT to the smart lighting system, a different username is created than the one user for direct control. When a different app is used for something like presence mimicking, another username is created. These usernames are used with every action to the lighting system and can be traced to the control source. In this way, it is possible to detect what caused the lights to be turned on.

Other control sources like sensors, scheduled events or physical switches or remotes are often also linked to a username. If this is not the case, it is possible to trace the control source by looking at the rules in the smart lighting system. The rules may contain a last triggered time which can be used to find a causation. It may also be possible to find this information in an event log. Rules describe the conditions for triggering (e.g. time-based or sensor-based) and the control action that will be sent to a specific light. If that control action contains a turn on for one of the lights that is turned on and the control source is considered desired when out of home, it can be discarded.

Step 133 may alternatively or additional comprise an optional step 137. Step 137 comprises determining an event that caused the light source to turn on automatically. This event may be detection of motion or activation of a routine at a preset time, for example. For instance, a smart lighting system may be able to trace events that were triggered recently. These events may be stored in a log.

In the embodiment of FIG. 4, step 139 is performed after steps 133, 135 and/or 137 have been performed. In an alternative embodiment, step 139 may be performed before or in parallel with one or more of these steps (or steps 133-137 may be omitted). Step 139 comprises determining whether user control or automatic control caused the light source to be turned on. User control may comprise interaction with a user device or a light switch, for example. Automatic control may comprise control based on sensor data and/or time-based control, for example. If it is determined in step 139 that automatic control caused the light source to be turned on, step 141 is performed. Else, step 111 is performed.

In the embodiment of FIG. 4, the cause determined in step 109 indicates whether user control or automatic control caused the light source to be turned on, and if determinable, a name associated with an action of turning on the light source, an event that caused light source to turn on, and/or a source of a control command to turn on the light source.

Step 141 comprises determining a frequency with which the light source is being turned on and off and/or a quantity of turned-on light sources. Step 111 is performed after step 141. Step 111 comprises deciding whether or not to notify the user in dependence on the cause determined in step 109.

In the embodiment of FIG. 4, step 111 is implemented by a step 143. Step 143 comprises deciding whether or not to notify the user in dependence on the cause and based on the frequency and/or the quantity determined in step 111.

For example, if relatively many light sources are on, this may indicate that a power outage has occurred. A high frequency of on/off switching may indicate that a sensor has been setup to sensitive. For example, every time the tree near the front door moves due to wind, a motion sensor may be triggered. A light source switching on and off with a high frequency may be annoying and/or consume a relatively large amount of power and therefore require urgent attention. A user may configure a sensor setting during the evening and when he is away during the next day be notified that he may have configured the sensor incorrectly.

After the decision has been made in step 111, a next step is selected in dependence on the decision. If the decision was made to notify the user, a step 113 is performed. Step 113 comprises transmitting the notification to the user device of the user. If the decision was made not to notify the user, a step 115 is or may be performed, e.g. dependent on the cause determined in step 109. Step 115 comprises logging that the light source was on while the user was way from home. Step 115 is also performed after step 113. After step 115, steps 101-103 and/or step 105 are repeated at a later time.

Figure 5:
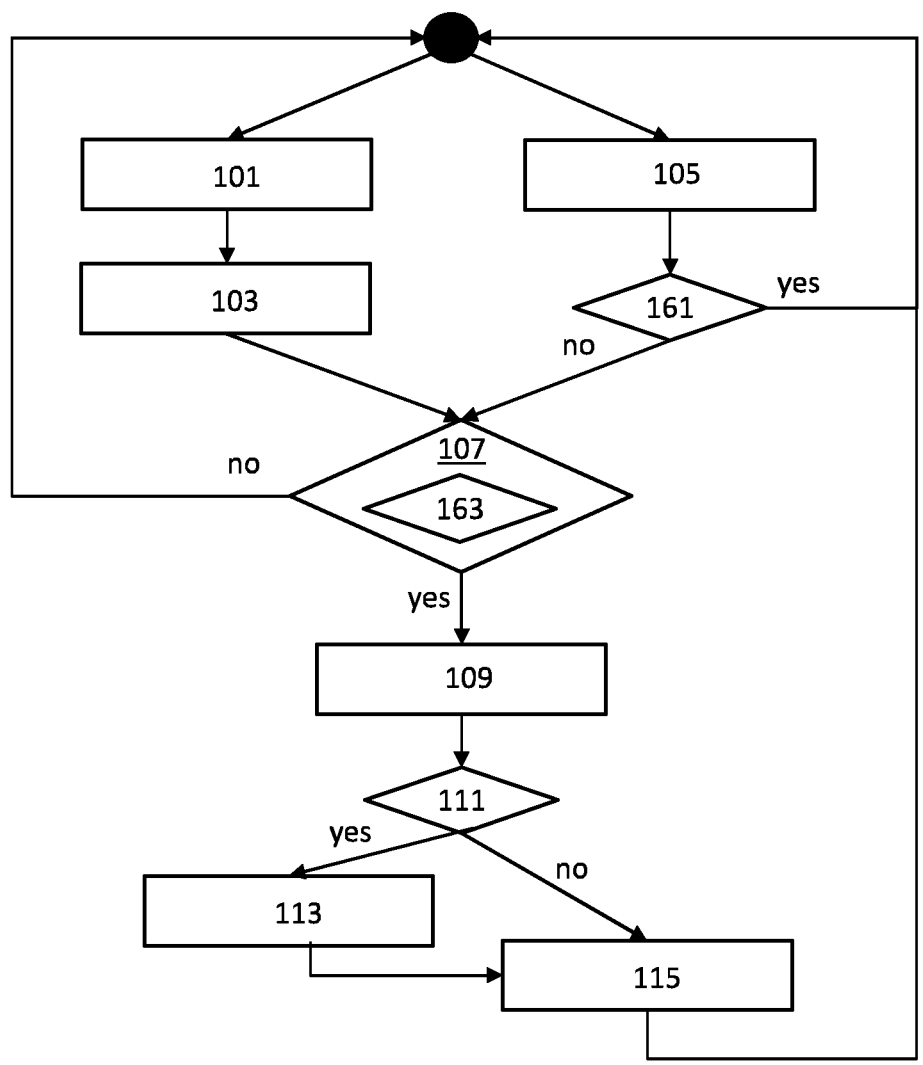
FIG. 5 is a flow diagram of a third embodiment of the method.

A third embodiment of the method of transmitting a notification from a system to a user device is shown in FIG. 5. The system is configured to determine a state of a light source. The light source is comprised in a lighting system. Step 101 comprises receiving user information. Step 103 comprises determining that a user is away from home based on the user information. Step 105 comprises receiving light information from the lighting system. The light information is indicative of the state of the light source, e.g. on or off. In the embodiment of FIG. 5, user information and light information are received on a regular basis and are received even if the user information and/or light information have not changed.

A step 161 is performed after step 105. Step 161 comprises determining whether the light source is located in a predefined spatial location. For example, the light source might be needed for security or easy entrance at night. For instance, if the light source is placed in a room with the name or type "Porch" or "Entrance", the assumption may be made that it is desired to be on even when not at home. These locations may be defined by the manufacturer of the system or by a user, for example.

If the light source is in a predefined location, e.g. in one of these one or more user-configured special locations, no notification needs to be transmitted and steps 101-103 and/or step 105 are repeated at a later time, after which step 107 may be repeated. If it is determined in step 161 that the light source is not in a predefined spatial location, step 107 is performed next. In an alternative embodiment, step 107 is also performed if the light source is in a predefined spatial location and the current time of day falls outside a certain time period and/or the amount of available light outside exceeds a certain threshold.

In the embodiment of FIG. 5, step 107 is implemented by a step 163. Step 163 comprises determining, based on the light information received in step 105, whether the light source is on while the user is away from home, as determined in step 103, and a time-out period has elapsed. If it has been determined in step 163 that the light source is on while the user is away from home and the time-out period has elapsed, step 109 is performed. Steps 109-115 are performed as described in relation to FIG. 3. Else, steps 101-105 are repeated, after which step 107 may be repeated.

In the embodiment of FIG. 5, if a light source located in a predefined spatial location (as determined in step 161) was on while the user was way from home, not only is no notification transmitted, but this occurrence is not included in a report either. In an alternative embodiment, no notification is transmitted in this case, but this occurrence is or may still be included in a report.

Figure 6:
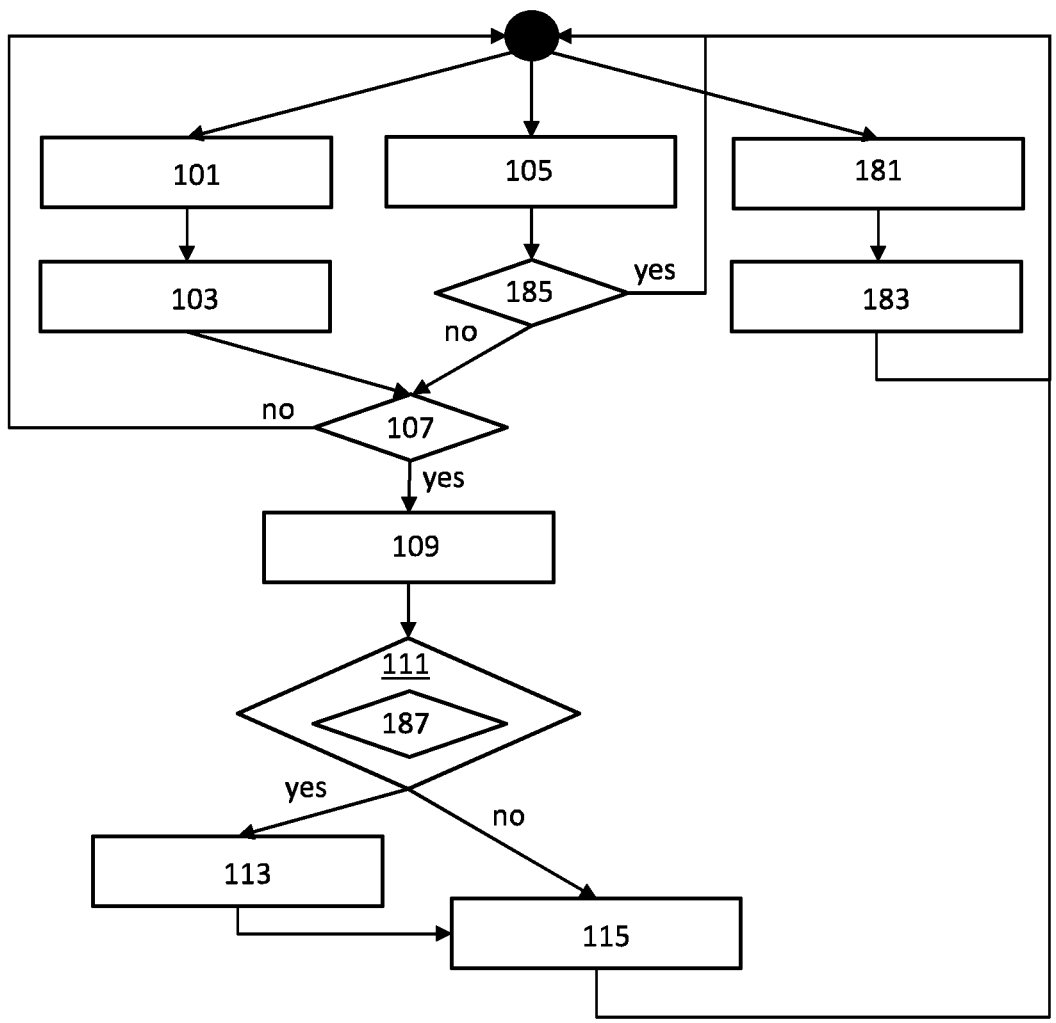
FIG. 6 is a flow diagram of a fourth embodiment of the method.

A fourth embodiment of the method of transmitting a notification from a system to a user device is shown in FIG. 6. The system is configured to determine a state of a light source. The light source is comprised in a lighting system. Step 101 comprises receiving user information. Step 103 comprises determining that a user is away from home based on the user information. Step 107 is performed after step 103.

A step 181 comprises receiving user input. The user input is indicative of one or more causes and/or indicative of one or more light sources. Next, a step 183 comprises associating the one or more causes with an instruction to notify the user or with an instruction not to notify the user when one of the one or more causes caused a light source to be turned on and/or associating the one or more light sources with an instruction not to notify the user when a light source of the one or more light sources is on while the user is away from home.

This user input may be provided by the user be in response to an earlier notification. For example, a user may have the option to not be notified about events for a certain light or cause anymore. Steps 181 and 183 may be performed (partly or fully) in parallel with steps 101 and 103 and steps 105 and 185. Steps 181 and 183 may be performed multiple times.

Step 105 comprises receiving light information from the lighting system. The light information is indicative of the state of the light source, e.g. on or off. Step 185 is performed after step 105. Step 185 comprises determining whether the light source is one of the one or more light sources indicated by the user in step 181. If so, no notification needs to be transmitted and steps 101-103 and/or step 105 are repeated at a later time, after which step 107 is repeated. Else, step 107 is performed next. Steps 185 is somewhat similar to step 161 of FIG. 5, except that a list of predefined lights is used instead of a list of predefined spatial locations. A list of predefined lights is normally more difficult for a manufacturer to configure than a list of predefined spatial locations, if not impossible.

In the embodiment of FIG. 6, if this (user-specified) light source was on while the user was way from home, not only is no notification transmitted, but this occurrence is not included in a report either. In an alternative embodiment, no notification is transmitted in this case, but this occurrence is or may still be included in a report.

In the embodiment of FIG. 6, step 107 is performed only after user information and light information has been received and is performed as soon as new user information or new light information has been received. Step 107 comprises determining, based on the light information received in step 105, whether the light source is on while the user is away from home, as determined in step 103. If it has been determined in step 107 that the light source is on while the user is away from home, step 109 is performed. Step 109 comprises determining what caused the light source to be turned on. Else, steps 101-103 and/or step 105 are repeated at a later time, after which step 107 is repeated.

After the cause has been determined in step 109, step 111 is performed. Step 111 comprises deciding whether or not to notify the user in dependence on the cause. In the embodiment of FIG. 6, step 111 is implemented by a step 187. Step 187 comprises deciding not to notify the user when the cause determined in step 109 is a one of the causes for which the user has requested in step 181 not to transmit a notification, or to notify the user when the cause determined in step 109 is one of the causes for which the user has requested in step 181 to transmit a notification.

After the decision has been made in step 111, a next step is selected in dependence on the decision. If the decision was made to notify the user, step 113 is performed. Step 113 comprises transmitting the notification to the user device of the user. If the decision was made not to notify the user, step 115 is or may be performed, e.g. dependent on the cause determined in step 109. Step 115 comprises logging that the light source was on while the user was way from home. Step 115 is also performed after step 113. After step 115, steps 101-103 and/or step 105 are repeated at a later time.

The embodiments of FIGS. 3 to 6 differ from each other in multiple aspects, i.e. multiple steps have been added or replaced. In variations on these embodiments, only a subset of these steps is added or replaced and/or one or more steps is omitted. For example, step 163 of FIG. 5 may be omitted from the embodiment of FIG. 5 and/or added to the embodiments of FIGS. 3, 4 and/or 6. Multiple, e.g. all, of the embodiments of FIGS. 3 to 6 may be combined.

Figure 7:
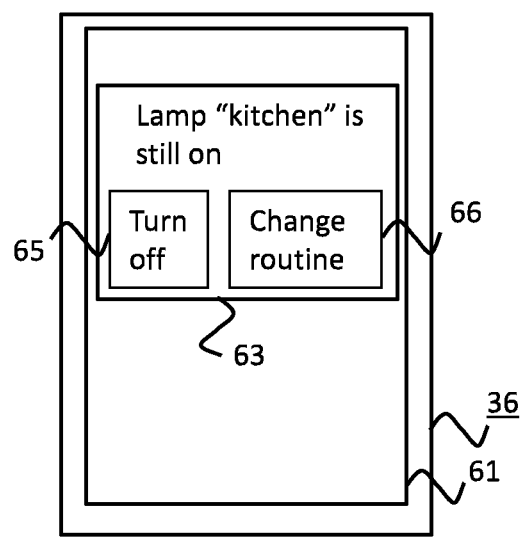
FIG. 7 shows an example of a notification shown on a user device.

FIG. 7 shows an example of a notification 63 shown on a display 61 of a user device 36, e.g. a mobile device. The notification 63 informs the user which lamp is still on while he is away (and no one else is at home). In this example, the lamp named "kitchen" (located in the kitchen) is still on. The notification 63 includes an option/button 65 to turn off the lamp. Upon receiving an affirmative response from the user device, the system that has transmitted the notification 63, e.g. to an app that displays the notification 63, controls the light source to turn off the light source, e.g. by transmitting a command to the lighting device that comprises the light source.

In the example of FIG. 7, the notification 63 also comprises an option/button to change the routine, i.e. to adjust a setting or rule, which caused the light source to turn on. The setting or rule may be adjusted with the app that displays the notification 63, for example. Upon receiving an affirmative response from the user device, the system adjusts the setting or rule.

Figure 8:
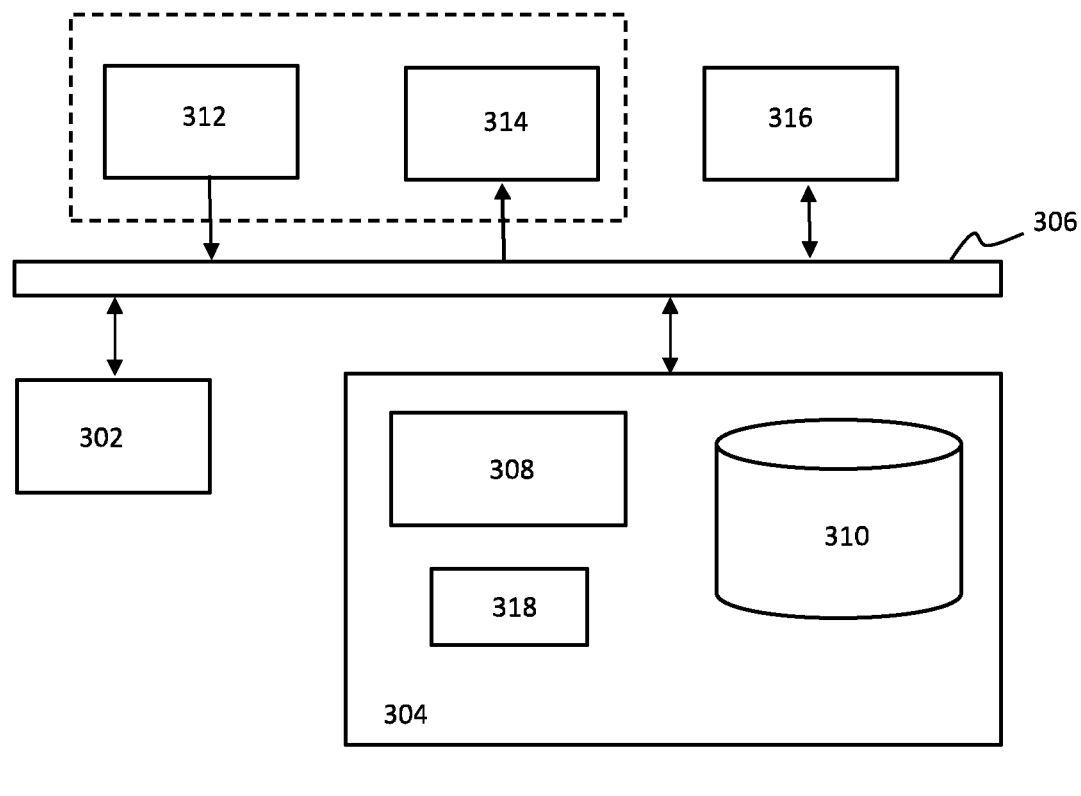
FIG. 8 is a block diagram of an exemplary data processing system for performing the method of the invention.

FIG. 8 depicts a block diagram illustrating an exemplary data processing system that may perform the method as described with reference to FIGS. 3 to 6.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 8 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for transmitting a notification to a user device, said system being configured to determine a state of a light source, said light source being comprised in a smart lighting system, said system comprising:
at least one input interface;
at least one output interface; and
at least one processor configured to:
receive user information via said at least one input interface,
determine that a user is away from home based on said user information,
receive light information from said lighting system via said at least one input interface, said light information being indicative of said state of said light source,
determine, based on said light information, that said light source is on while said user is away from home, when it has been determined that said light source is on while said user is away from home, determine what caused said light source to be turned on, by determining, via the smart lighting system, a source of a control command to turn on the light source, after said cause has been determined, decide whether or not to notify said user in dependence on said cause, and after said decision has been made, transmit, via said at least one output interface, said notification to said user device of said user in dependence on said decision;

wherein said at least one processor is configured to determine what caused said light source to be turned on by:

determining whether user control or automatic control caused said light source to be turned on, or determining a name associated with an action of turning on said light source, an event that caused light source to turn on, and/or a source of a control command to turn on said light source.

2. The system as claimed in claim 1, wherein said at least one processor is configured to generate a report for said user on a regular basis and include in said report, in dependence on said cause, that said light source was on while said user was way from home.

3. The system as claimed in claim 1, wherein said at least one processor is configured to determine what caused said light source to be turned on by determining whether user control or automatic control caused said light source to be turned on, and wherein user control comprises interaction with said user device, a further user device or a light switch and/or automatic control comprises control based on sensor data and/or time-based control.

4. The system as claimed in claim 1, wherein said at least one processor is configured to, upon determining that automatic control caused said light source to be turned on, determine a frequency with which said light source is being turned on and off and/or a quantity of turned-on light sources and decide, based on said frequency and/or said quantity, whether or not to notify said user.

5. The system as claimed in claim 1, wherein said at least one processor is configured to, upon determining that said light source is on while said user is away from home, determine whether a setting or rule exists which automatically turns off said light source and decide, based on said cause and in dependence on said existence of said setting or rule, whether or not to notify said user.

6. The system as claimed in claim 1, wherein said at least one processor is configured to decide whether or not to notify said user in dependence on a spatial location of said light source.

7. The system as claimed in claim 1, wherein said at least one processor is configured to receive user input indicative of one or more causes and associate said one or more causes with an instruction to notify said user or with an instruction not to notify said user when one of said one or more causes caused a light source to be turned on.

8. The system as claimed in claim 1, wherein said at least one processor is configured to receive user input indicative of one or more light sources and associate said one or more light sources with an instruction not to notify said user when a light source of said one or more light sources is on while said user is away from home.

9. The system as claimed in claim 1, wherein said at least one processor is configured to, upon determining that said light source is on while said user is away from home and a time-out period has elapsed, determine what caused said light source to be turned on.

10. The system as claimed in claim 1, wherein said at least one processor is configured to include in said notification an option to turn off said light source and control said light source to turn off said light source upon receiving an affirmative response from said user device.

11. The system as claimed in claim 1, wherein said at least one processor is configured to include in said notification an option to adjust a setting or rule which caused said light source to turn on and adjust said setting or rule upon receiving an affirmative response from said user device.

12. A method of transmitting a notification from a system to a user device, said system being configured to determine a state of a light source, said light source being comprised in a smart lighting system, said method comprising:

receiving user information;

determining that a user is away from home based on said user information;

receiving light information from said lighting system, said light information being indicative of said state of said light source;

determining, based on said light information, that said light source is on while said user is away from home;

if it has been determined that said light source is on while said user is away from home, determining what caused said light source to be turned on, by determining, via the smart lighting system, a source of a control command to turn on the light source;

after said cause has been determined, deciding whether or not to notify said user in dependence on said cause; and after said decision has been made, transmitting said notification to said user device of said user in dependence on said decision;

wherein said determining what caused said light source to be turned on comprises:

determining whether user control or automatic control caused said light source to be turned on, or determining a name associated with an action of turning on said light source, an event that caused light source to turn on, and/or a source of a control command to turn on said light source.

13. A non-transitory computer readable medium comprising computer program code to perform the method of claim 12 when run on a processor.

* * * * *